United States Patent
Lee et al.

(10) Patent No.: US 9,188,799 B2
(45) Date of Patent: Nov. 17, 2015

(54) LIQUID CRYSTAL DISPLAY DEVICE HAVING MINIMIZED BEZEL

(71) Applicant: LG DISPLAY CO., LTD., Seoul (KR)

(72) Inventors: YoungJang Lee, Seoul (KR); HoYoung Jeong, Goyang (KR); BokYoung Lee, Paju (KR)

(73) Assignee: LG Display Co., Ltd., Seoul (KR)

( * ) Notice: Subject to any disclaimer, the term of this patent is extended or adjusted under 35 U.S.C. 154(b) by 196 days.

(21) Appl. No.: 13/727,220

(22) Filed: Dec. 26, 2012

(65) Prior Publication Data

US 2014/0104149 A1 Apr. 17, 2014

(30) Foreign Application Priority Data

Oct. 12, 2012 (KR) ........................ 10-2012-0113804

(51) Int. Cl.
| | | |
|---|---|---|
| *G02F 1/1345* | (2006.01) | |
| *G09G 3/36* | (2006.01) | |
| *G02F 1/133* | (2006.01) | |
| *G02F 1/1333* | (2006.01) | |
| *G02F 1/1362* | (2006.01) | |

(52) U.S. Cl.
CPC ........ *G02F 1/13306* (2013.01); *G02F 1/13452* (2013.01); *G02F 1/13454* (2013.01); *G02F 1/133345* (2013.01); *G02F 2001/136222* (2013.01); *G02F 2201/42* (2013.01)

(58) Field of Classification Search
USPC ......................................... 349/149, 151–152
See application file for complete search history.

(56) References Cited

U.S. PATENT DOCUMENTS

| | | | | |
|---|---|---|---|---|
| 6,882,378 | B2 * | 4/2005 | Nagata et al. ................... | 349/54 |
| 6,992,745 | B2 * | 1/2006 | Kim et al. ..................... | 349/152 |
| 6,999,150 | B2 * | 2/2006 | Murade ......................... | 349/151 |
| 2002/0158995 | A1 * | 10/2002 | Hwang et al. .................. | 349/43 |
| 2003/0094615 | A1 | 5/2003 | Yamazaki et al. | |
| 2006/0003479 | A1 * | 1/2006 | Park et al. ....................... | 438/30 |
| 2006/0061711 | A1 | 3/2006 | Lee et al. | |
| 2006/0202934 | A1 * | 9/2006 | Shin et al. ....................... | 345/95 |
| 2009/0219457 | A1 | 9/2009 | Seo et al. | |
| 2009/0296038 | A1 | 12/2009 | Yoon et al. | |
| 2010/0301326 | A1 * | 12/2010 | Miyairi et al. ................. | 257/43 |
| 2011/0254757 | A1 | 10/2011 | Kim | |

FOREIGN PATENT DOCUMENTS

| | | |
|---|---|---|
| CN | 101097313 A | 1/2008 |
| EP | 1176457 A2 | 1/2002 |
| TW | 201241532 A | 10/2012 |

OTHER PUBLICATIONS

Extended European Search Report issued in corresponding European Patent Application No. 12008576.6, mailed Jan. 27, 2014, 12 pages.
Office Action issued in Taiwanese Patent Application No. 101149203, mailed Oct. 16, 2014, 15 pages.

* cited by examiner (Continued)

*Primary Examiner* — Hoan C Nguyen
(74) *Attorney, Agent, or Firm* — Brinks Gilson & Lione

(57) ABSTRACT

A liquid crystal display (LCD) device includes: a dummy region on which a gate driver is mounted; an active region including a plurality of pixel regions to implement an actual image; and first and second lines disposed in the dummy region, wherein the first line is formed on a substrate and the second line is formed on an insulating layer such that portions of the first and second lines overlap with the insulating layer interposed therebetween.

17 Claims, 6 Drawing Sheets

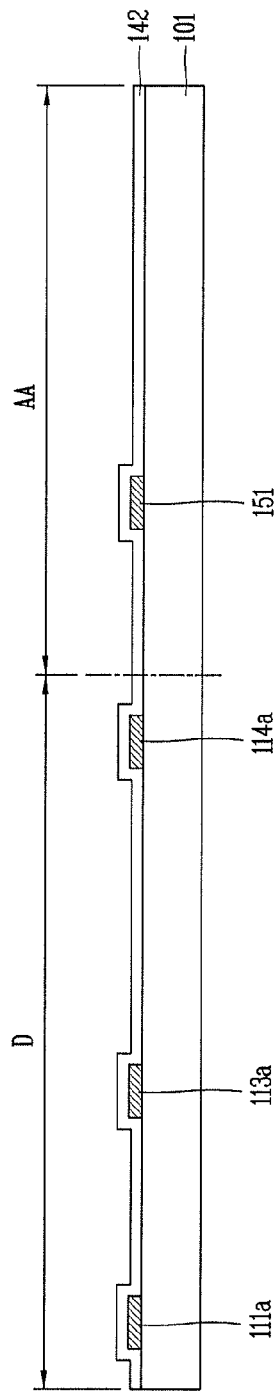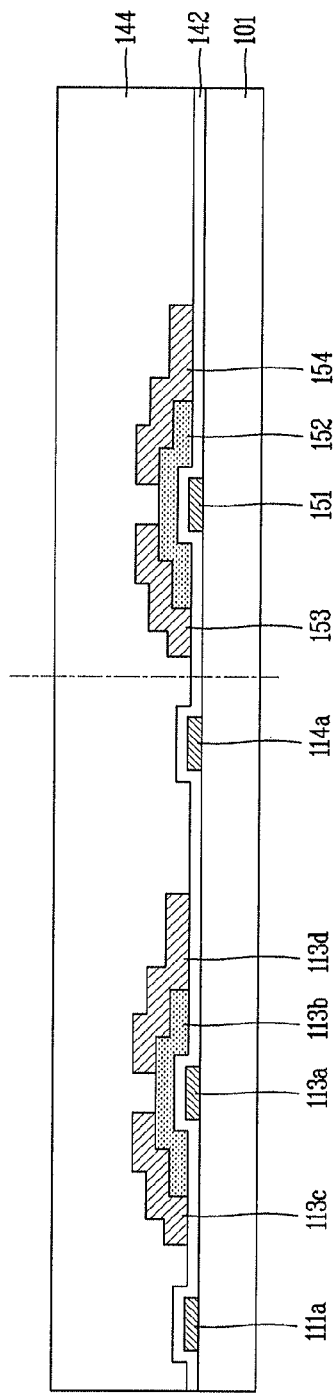

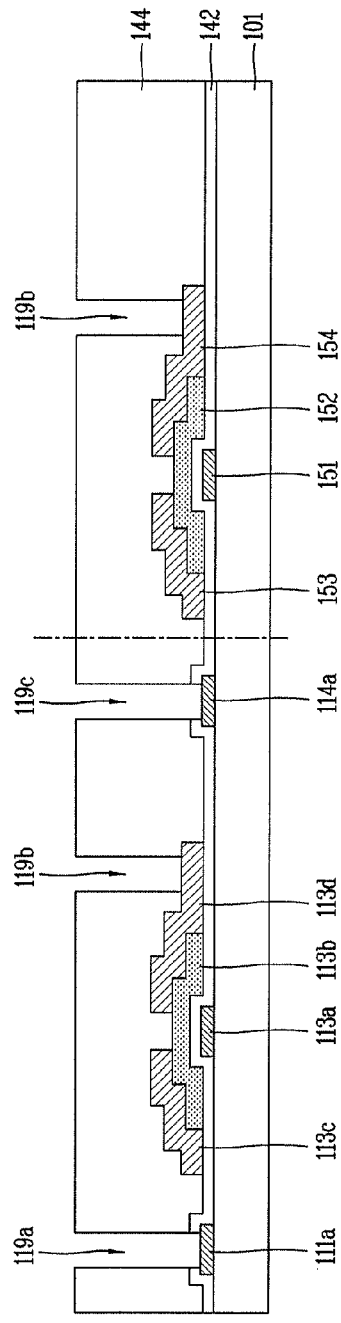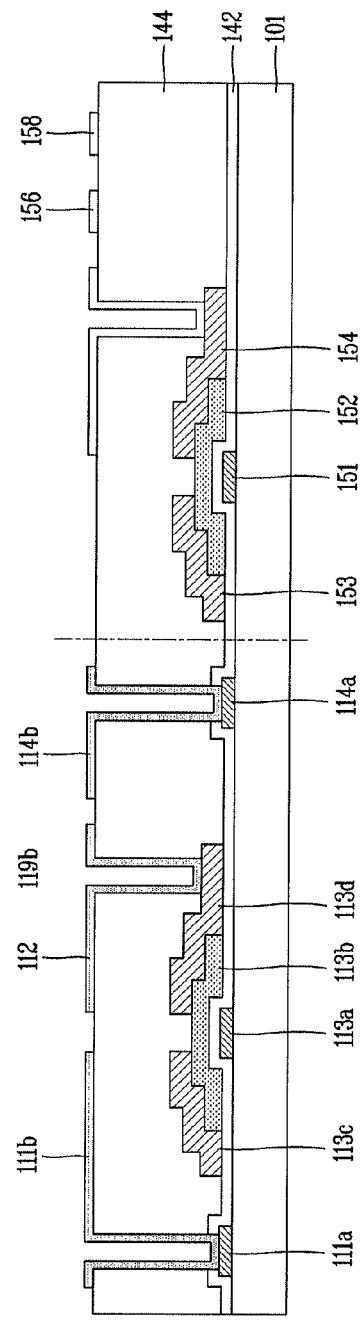

LIQUID CRYSTAL DISPLAY DEVICE HAVING MINIMIZED BEZEL

This application claims the benefit of earlier filing date and right of priority to Korean Patent Application No. 10-2012-0113804, filed on Oct. 12, 2012, the contents of which is hereby incorporated by reference for all purposes as if fully set forth herein in its entirety.

FIELD OF THE DISCLOSURE

The present disclosure relates to a liquid crystal display device in which a bezel is minimized by overlapping circuit lines with an insulating layer interposed therebetween in an outer edge region.

DESCRIPTION OF THE RELATED ART

In general, a liquid crystal display (LCD) device displays an image by adjusting light transmittance of liquid crystal having dielectric anisotropy by using an electric field. To this end, the LCD device includes a liquid crystal panel on which pixel regions are arranged in a matrix form and a driving circuit for driving the liquid crystal panel.

The liquid crystal panel is formed by attaching a first substrate and a second substrate and forming a liquid crystal layer therebetween. A plurality of gate lines and a plurality of data lines are arranged to cross vertically to define the pixel regions on the first substrate. Pixel electrodes are formed in each pixel region, and a thin film transistor (TFT) is formed in each crossing of each of the gate lines and data lines. The TFT is turned on according to a scan signal of each gate line to apply a data signal of each data line to each pixel electrode to drive the liquid crystal layer.

Also, black matrices for blocking light transmission in a portion excluding the pixel region and a color filter layers formed in the respective pixel regions to implementing actual colors are disposed on the second substrate.

The driving circuit includes a gate driver for driving the plurality of gate lines, a data driver for driving a plurality of data lines, a timing controller for supplying control signals for controlling the gate driver and the data driver, data signals, and the like.

The gate driver includes a shift register for sequentially outputting scan pulses to the respective gate lines. The shift register includes a plurality of stages, which are dependently connected to each other. The plurality of stages sequentially output scan pulses to sequentially scan the gate lines of the liquid crystal panel.

In detail, a first stage, among the plurality of stages, receives a start signal as a trigger signal from the timing controller, and the other remaining stages excluding the first stage receives an output signal as a trigger signal from the previous stage. In addition, each of the plurality of stages receives at least one clock pulse among a plurality of clock pulses each having a mutually sequential phase difference. Thus, the first to the final stages sequentially output scan pulses.

In the related art, a gate driver integrated circuit (IC) including the shift register is used the gate driver and the gate driver iC is connected to a gate line pad of a liquid crystal panel by using a TCP (Taped Carrier Package) process, or the like.

However, recently, as the data driver, a data driver integrate circuit has been used, but in case of the gate driver, a gate in panel (GIP) technique for forming a shift register on a liquid crystal display panel is used to reduce material cost and the number of processes and shorten a processing time.

The related art LCD device having a GIP structure will be described.

FIG. 1 is a plan view of the related art LCD device having a GIP structure and FIG. 2 is an enlarged plan view of a region 'A' in FIG. 1.

As illustrated in FIG. 1, in the related art LCD device having a GIP structure, a first substrate 1 and a second substrate 2 are attached by a sealant 10 with a predetermined space therebetween. Here, the first substrate 1 is formed to be larger than the second substrate 2 and has a non-display region in which a data driver, or the like, is mounted, a display region is formed in the inner side of the sealant 10 in the first substrate 1 and the second substrate 2.

The display region of the attached first substrate 1 and the second substrate 2 is divided in to an active region A/A and a dummy region D. A gate line, a data line, a pixel electrode, and a TFT are formed in the active region A/A of the first substrate 1, and a black matrix layer and a color filter layer are formed in the active region A/A of the second substrate 2.

The GIP gate driver 3, a GIP dummy gate driver 4, a ground 11, control signal lines 12 for applying various signals such as a clock signal, an enable signal, a start signal, and the like, output from the timing controller to the GIP gate driver 3 and the GIP dummy gate driver 4, a GIP circuit 13 configured as a shift register, and a common line 14 are formed in the dummy region D of the first substrate 1. Black matrices (not shown) are formed in the dummy region D of the second substrate 2 in order to block light transmission to the region.

However, the LCD device having the foregoing structure has the following problems.

Recently, research into minimizing a size of a bezel including a dummy region has been continuously conducted in order to reduce a size of a display device and obtain a fine outer appearance thereof while maintaining the same size of screen.

However, as shown in FIG. 2, since the ground 11, the control signal lines 12, the shift GIP circuit 13, the common line 14, and the like are disposed in the dummy region D of the related art LCD device having a GIP structure, a width d1 of the dummy region D should be maintained to have a certain size or greater. Thus, there is a limitation in reducing the area of the dummy region D, resulting in a limitation in reducing a bezel, and thus, it is impossible to fabricate an LCD device having a small bezel.

SUMMARY

A liquid crystal display (LCD) device includes: a dummy region on which a gate driver is mounted; an active region including a plurality of pixel regions and implementing an actual image; and a first line and a second line disposed on the dummy region, wherein the first line is on a substrate and the second line is on an insulating layer such that a parts of the first line and the second line are overlapped with the insulating layer interposed therebetween.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A to 7D are views illustrating a method for fabricating an LCD device according to an embodiment of the present invention.

DETAILED DESCRIPTION OF THE EXEMPLARY EMBODIMENTS

Hereinafter, a liquid crystal display device according to embodiments of the present invention.

Figure 3:
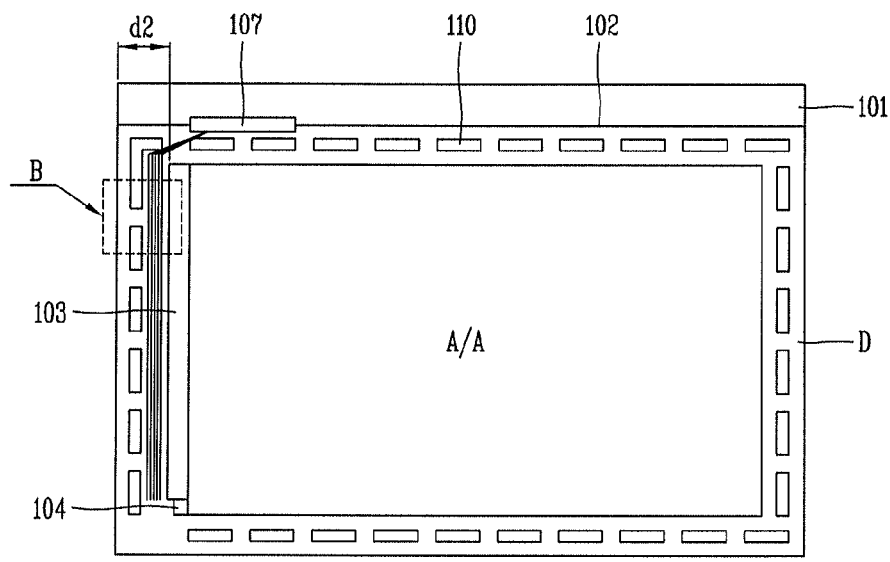
FIG. 3 is a plan view illustrating a structure of a liquid crystal display (LCD) device according to an embodiment of the present invention.

FIG. 3 is a plan view illustrating a liquid crystal display (LCD) device having a gate in panel (GIP) structure according to an embodiment of the present invention.

As illustrated in FIG. 3, the LCD device having a GIP structure according to an embodiment of the present invention is formed by attaching a first substrate 101 and a second substrate 102 made of a transparent material such as glass or plastic with a sealant 110. Here, the first substrate 101 is formed to be larger than the second substrate 102 to include a non-display region on which a data driver, or the like, is mounted, and a display region is formed in the interior of the first substrate 101 and the second substrate 102 attached by the sealant 110.

Also, the display region of the attached first substrate 10 and the second substrate 102 is divided into an active region A/A and a dummy region D.

The active region A/A is a region on which an image is actually implemented. Although not shown, the active region A/A includes a plurality of pixel regions defined by a plurality of gate lines and data lines disposed on the first substrate 101, TFTs as switching elements formed in the respective pixel regions and driven upon receiving a signal applied thereto to apply an image signal to an image region, a pixel electrode and a common electrode formed in the pixel region and driving liquid crystal molecules of a liquid crystal layer upon receiving the image signal according to an operation of the TFTs to control transmittance of light transmitted through the liquid crystal layer to thus implement an image, a black matrix formed on the second substrate 102 to block light transmission to a region other than a region in which an image is implemented, and a color filter layer including R, G, and B color filters to implement actual colors.

A GIP gate driver 103, a GIP dummy gate driver 104, a ground 111, control signal lines 112 for applying various signals such as a clock signal, an enable signal, a start signal, and the like, output from the timing controller to the GIP gate driver 103 and the GIP dummy gate driver 104, a GIP circuit 113 configured as a shift register, and a common line 114 are formed in the dummy region D of the first substrate 101. Black matrices (not shown) are formed in the dummy region D of the second substrate 102 in order to block light transmission to the region.

The control signal lines 112 include a clock signal line, an enable signal line, a start signal line, and the like.

Figure 4A:
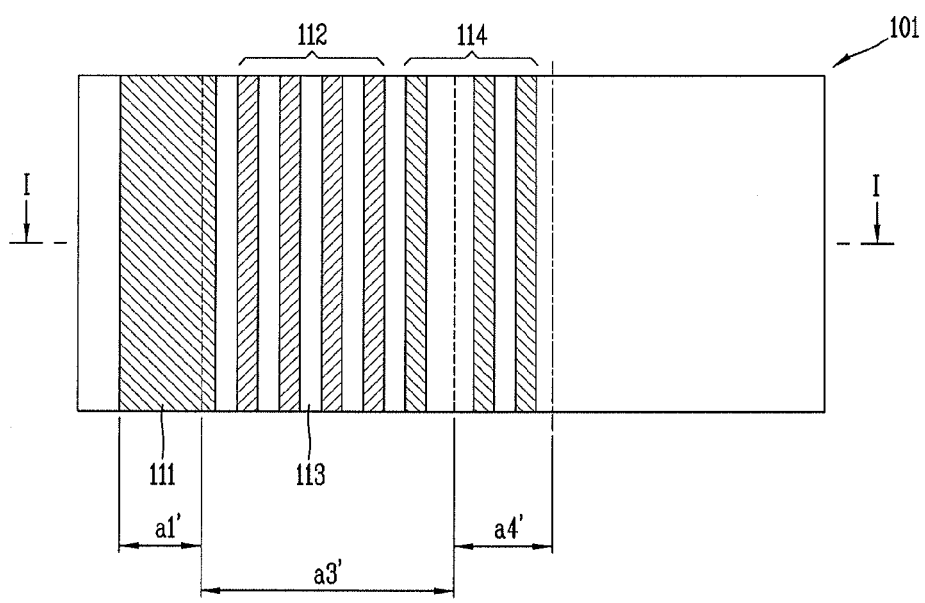
FIG. 4A is an enlarged partial plan view of a portion 'B' in FIG. 3.
Figure 4B:
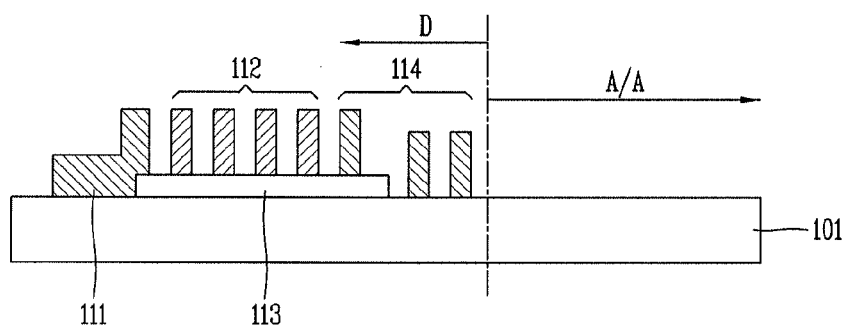
FIG. 4B is a schematic sectional view of the portion 'B' in FIG. 3.

FIGS. 4A and 4B are partially enlarged views of a region 'B' in FIG. 3, in which FIG. 4A is a plan view illustrating a disposition of lines in the dummy region D, and FIG. 4B is a cross-sectional view schematically illustrating a layer structure.

As illustrated in FIG. 4A, a common line 114, a GIP circuit 113, a control signal line 112, and a ground 111 are sequentially disposed from a boundary of the active region A/A to an end portion of the first substrate 101 in the dummy region D. Here, it is illustrated that a particular number of common lines 114 and control signal lines 112 are formed, but this is for the description purpose and the lines of the present invention are not limited to a particular number. Substantially, a number of lines may be determined by a size of a fabricated liquid crystal panel, a number of pixels, a number of GIP gate drivers 103 mounted on the liquid crystal panel, and the like.

As illustrated in FIGS. 4A and 4B, the GIP circuit 113 is disposed on the first substrate 101, and the ground 111 and the common line 114 are disposed in both sides of the GIP circuit 113. The control signal line 112 is disposed on the GIP circuit 113. Here, the control signal line 112 is formed to completely overlap the GIP circuit 113, and the ground 111 and the common line 114 are formed such that portions thereof are formed on the first substrate 101 and other portions are formed on the GIP circuit 113 to overlap with the GIP circuit 113. Here, only a portion of the control signal line may overlap with the GIP circuit 113.

In this manner, the control signal line 112 is formed on the GIP circuit 113, and portions of the ground 111 and the common line 114 are formed on the GIP circuit 113, a width of the dummy region can be reduced relative to the related art LCD device.

Figure 1:
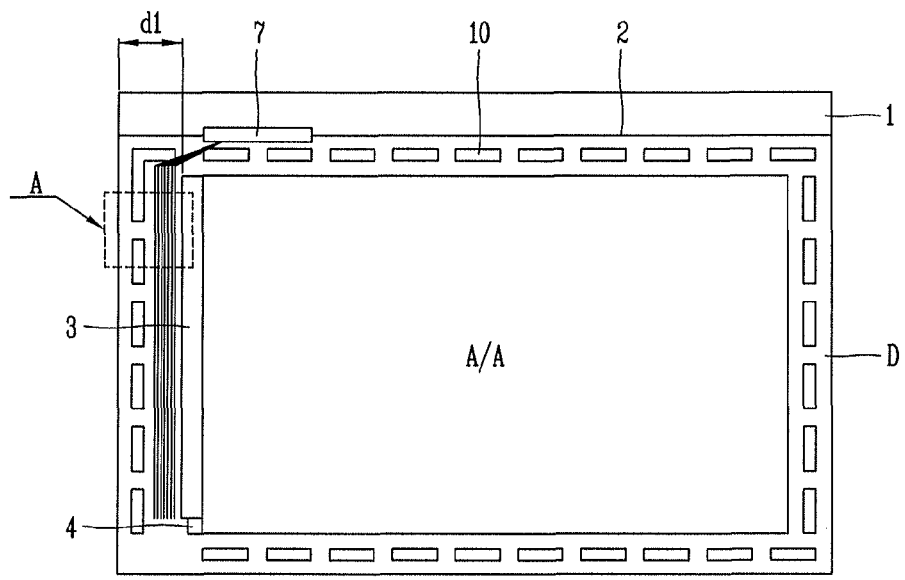
FIG. 1 is a plan view illustrating a structure of a related art liquid crystal display (LCD) device.
Figure 2:
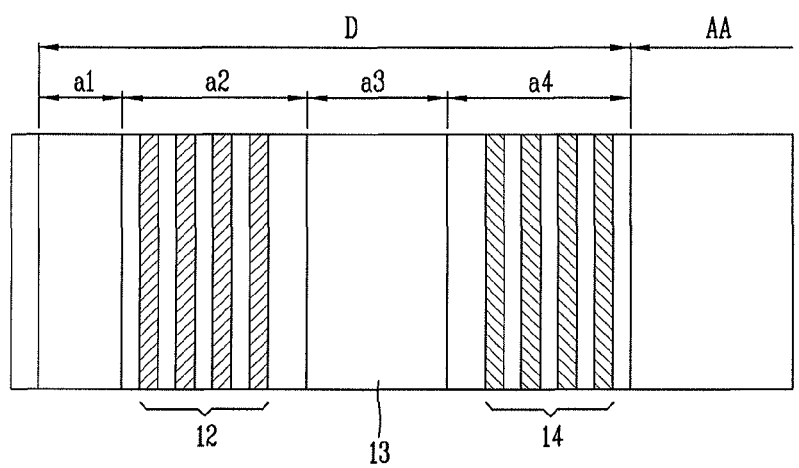
FIG. 2 is an enlarged partial plan view of a portion 'A' in FIG. 1.

As for the structure of related art LCD device illustrated in FIG. 2 and that of the LCD device according to an embodiment of the present invention illustrated in FIG. 4A, in the related art, the ground 111, the GIP circuit 113, the control signal 112, and the common line 114 are disposed on the first substrate 101 having widths of a1, a2, a3, and a4. In comparison, in an embodiment of the present invention, the ground 111, the GIP circuit 113, and the common line 114 are disposed on the first substrate 101 having the widths of a1', a2', and a4'.

Since the control signal line 112 is formed on the GIP circuit 113, it does not occupy any region of the first substrate 101. Also, since a portion of the ground 111 overlaps with the GIP circuit 113, a1' is smaller than a1 (a1'<a1), and since a portion of the common line 114 overlaps with the GIP circuit, a4' is smaller than a4 (a4'<a4). Here, 50 to 100% of the ground 111 of the entire area overlaps with the GIP circuit 113, and 50 to 100% of the common line 114 of the entire area overlaps with the GIP circuit 113. As a result, in an embodiment of the present invention, the width of the dummy region may be reduced by a3+(a1−a1')+(a4−a4') (i.e., d1>d2) in comparison to the related art.

An embodiment of the present invention will be described in detail with reference to the accompanying drawings.

Figure 5:
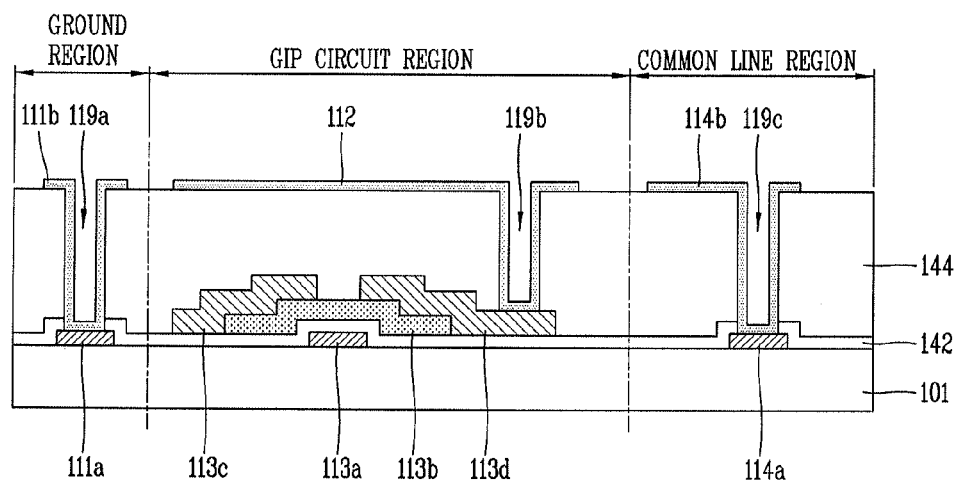
FIG. 5 is a cross-sectional view specifically illustrating a structure of an LCD device according to a first embodiment of the present invention.

FIG. 5 shows a structure of an LCD device according to a first embodiment of the present invention, in which only the dummy region is illustrated.

As shown in FIG. 5, the dummy region D of the first substrate 101 includes a ground region, a GIP circuit region, and a common line region. A first ground 111a, a gate electrode 113a of a TFT for a shift register forming a GIP circuit, and a first common line 114a are formed in the ground region, the GIP circuit region, and the common line region of the first substrate 101.

The first ground 111a, the gate electrode 113a of the TFT for a shift register, and the first common line 114a may be formed with different metals through different processes, but preferably, they are formed with the same metal through the same process. Here, first ground 111a, the gate electrode 113a of the TFT for a shift register, and the first common line 114a may be formed as a single layer made of a metal having excellent conductivity such as aluminum (Al) or an Al alloy, respectively. Also, the first ground 111a, the gate electrode 113a of the TFT for a shift register, and the first common line 114a may be formed as a plurality of layers such as AlNd/Mo.

A gate insulating layer 142 made of an inorganic insulating material such as SiOx or SiNx is formed on the first substrate 101 with the first ground 111a, the gate electrode 113a of the TFT for a shift register, and the first common line 114a formed thereon.

A semiconductor layer 113b is formed on the gate insulating layer 142 in the GIP circuit region. The semiconductor layer 113b may be largely made of amorphous silicon (a-Si), but a crystalline silicon or an oxide semiconductor may also be used.

A source electrode 113c and a drain electrode 113d are formed on the semiconductor layer 113b, completing a TFT for a shift register. Here, the source electrode 113c and the drain electrode 113d may be made of a metal having excellent conductivity such as aluminum (Al), an Al alloy, molybdenum (Mo), or the like. Although not shown, various lines, as well as the TFT for a shift register, may be formed in the GIP circuit region.

A passivation layerpassivation layer 144 is formed on the first substrate 101 with the TFT for a shift register formed thereon. The passivation layer 144 may be made of an organic material such as photoacryl or may be made of an inorganic material such as SiOx or SiNx. Also, the passivation layer 144 may be formed as a dual layer including an inorganic passivation layer and an organic passivation layer.

A first contact hole 119a, a second contact hole 119b, and a third contact hole 119c are formed in the GIP circuit region and the common line region. Here, the second contact hole 119b is formed only in the passivation layer 144 to allow the TFT for a shift register to be exposed therethrough. The first contact hole 119a and the third contact hole 119c are formed in the gate insulating layer 142 and the passivation layer 144 to allow the first ground 111a and the first common line 114a to be exposed therethrough, respectively.

A second ground 111b is formed in the ground region above the passivation layer 144, a control circuit line 112 is formed in the GIP circuit region, and a second common line 114b is formed in the common line region. The second ground 111b is electrically connected to the first ground 111a through the first contact hole 119a, the control circuit line 112 is electrically connected to the drain electrode 113d of the TFT for a shift register, i.e., a GIP circuit, through the second contact hole 119d, and the second common line 114b is electrically connected to the first common line 119a through the third contact hole 119c.

Here, a portion of the second ground 111b and a portion of the second common line 114b extend to the GIP circuit region. Thus, since the portion of the second ground 111b and the portion of the second common line 114b, as well as the control circuit line 112, are formed in the GIP circuit region, the GIP circuit (i.e., the shift register), overlaps with the control circuit line 112 and portions of the second ground 111b and the second common line 114b with the insulating layer (gate insulating layer) 142 and/or the passivation layer 144 interposed therebetween.

In this manner, in the first embodiment of the present invention, since the control circuit line 112 and the portions of the second ground 111b and the second common line 114 are formed in an upper side of the GIP circuit with the insulating layer interposed therebetween in the GIP circuit region, the width of the dummy region can be reduced relative to the related art LCD device.

Here, it is illustrated in the drawing that portions of the second ground 111b and the second common line 114b overlap with the GIP circuit, but only the control circuit line 112 may be formed to overlap with the GIP circuit and the second ground 111b and the second common line 114b do not overlap with the GIP circuit or a portion of only one of the second ground 111b and the second common line 114b may overlap with the GIP circuit.

In other words, an embodiment of the present invention includes any structure in which the control circuit line 112 and the entirety or portions of the second ground 111b and the second common line 114 are overlap with the GIP circuit with the insulating layer interposed therebetween.

Figure 6:
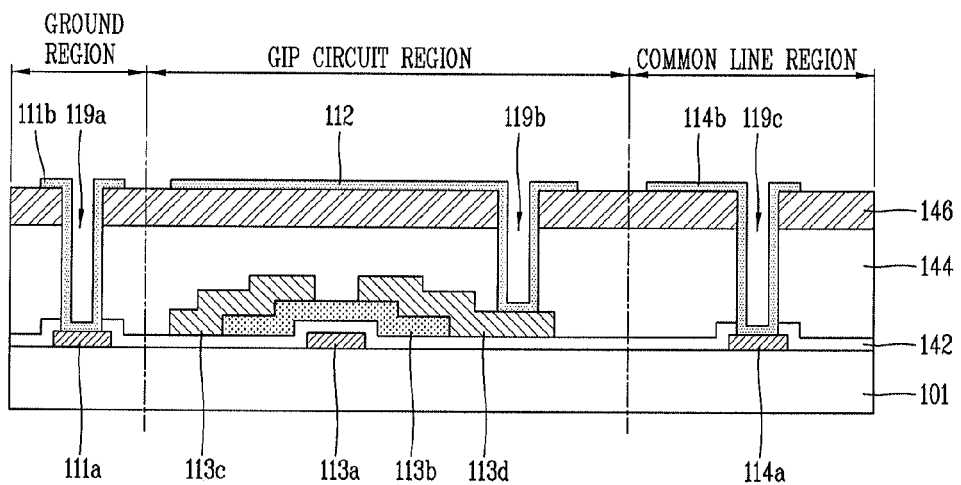
FIG. 6 is a cross-sectional view specifically illustrating a structure of an LCD device according to a second embodiment of the present invention.

FIG. 6 is a view illustrating a structure of an LCD device according to a second embodiment of the present invention.

As illustrated in FIG. 6, the dummy region D includes a ground region, a GIP circuit region, and a common line region. The first ground 111a and the first common line 114a are formed in the ground region and the common line region of the first substrate 101. Also, a GIP circuit including a TFT for a shift register comprised of the gate electrode 113a, the semiconductor layer 113b, the source electrode 113c, and the drain electrode 114 is formed in the GIP circuit region.

Here, the gate insulating layer 142 is formed on first ground 111a, the first common line 114a, and the gate electrode 113a of the TFT for a shift register.

The passivation layer 144 formed of an inorganic layer, an organic layer, or an organic layer/inorganic layer is formed on the first substrate 101 with the TFT for a shift register formed thereon.

A color filter layer 146 is formed on the passivation layer 144. Namely, the LCD device having the foregoing structure is an LCD device having a color filter on TFT (COT) structure in which the color filter layer 146 is formed on the first substrate 101. In this structure, the color filter layer 146 is formed on the first substrate, in comparison to the structure of the LCD device illustrated in FIG. 4 in which the color filter layer is formed on the second substrate (i.e., the upper substrate).

In the LCD device having the COT structure, the R, G, and B color filters are formed directly on the corresponding pixel, there is no need to consider a defect due to misalignment of the first substrate and the second substrate generated when the color filter layer is formed on the second substrate or an attachment margin.

Although not shown, the color filter layer 146 may be a single layer of one color among an R-color filter layer, a G-color filter layer, and a B-color filter layer, or may be formed as a triple-layer by stacking the R-color filter layer, the G-color filter layer, and the B-color filter layer, or may be formed as a dual-layer including two different colors.

The first contact hole 119a, the second contact hole 119b, and the third contact hole 119c are formed in the GIP circuit region and the common line region. Here, the second contact hole 119b is formed only in the passivation layer 144 and the color filter layer 146 to allow the TFT for a shift register to be exposed therethrough. The first contact hole 119a and the third contact hole 119c are formed in the gate insulating layer 142, the passivation layer 144, and the color filter layer to allow the first ground 111a and the first common line 114a to be exposed therethrough, respectively.

A second ground 111b is formed in the ground region above the color filter layer 146, a control circuit line 112 is formed in the GIP circuit region, and a second common line 114b is formed in the common line region. The second ground 111b is electrically connected to the first ground 111a through the first contact hole 119a, the control circuit line 112 is electrically connected to the drain electrode 113d of the TFT for a shift register, i.e., a GIP circuit, through the second contact hole 119d, and the second common line 114b is electrically connected to the first common line 119a through the third contact hole 119c.

Although not shown, a buffer layer made of an inorganic insulating material or an organic insulating material may be formed on the color filter layer 146. The buffer layer serves to improve interface characteristics with the color filter layer 146 when the second ground 111b and the second common line 114b are formed. Of course, in this structure, the first contact hole 119a, the second contact hole 119b, and the third contact hole 119c are formed on the buffer layer.

Although not shown, a black matrix may be formed in the dummy region of the second substrate to block a light transmission thereto, thus preventing light from being transmitted to degrade picture quality.

Hereinafter, a method for fabricating the LCD device having the foregoing structure will be described. Here, a method for fabricating the LCD device having the structure illustrated in FIG. 5 is described, but the LCD device having the structure illustrated in FIG. 6 may also be fabricated by the same method.

Also, hereinafter, a method for fabricating the LCD device having a particular pixel structure is described, but the present invention is not limited only to the particular pixel structure. The present invention may be applicable to LCD devices of various modes such as an in plane switching (IPS) mode LCD device, a twisted nematic (TN) mode LCD device, a vertical alignment (VA) mode LCD device, and the like. Also, in the following description, various electrodes and insulating layers have a particular structure, but the present invention is not limited thereto. The present invention may be applied to LCD devices having any structure as long as a line of a dummy region is formed in an overlapping manner.

FIGS. 7A to 7D are views illustrating a method for fabricating an LCD device according to an embodiment of the present invention.

First, as illustrated in FIG. 7A, AlNd and Mo are successively stacked on the first substrate 101 made of transparent glass of plastic and including the dummy region D and the active region A/A through a sputtering method and subsequently etched through photolithography to form the first ground 111a, the gate electrode 113a for a shift register of a GIP circuit, and the second common line 112 in the dummy region D and the gate electrode 151 of a TFT for switching of a pixel in the active region A/A. Next, an inorganic insulating material such as SiOx or SiNx is stacked on the entirety of the first substrate through chemical vapor deposition (CVD) to form the gate insulating layer 142.

Subsequently, as illustrated in FIG. 7B, an amorphous semiconductor material such as an amorphous silicon is stacked on the first substrate 101 and etched to form the semiconductor layer 113b for a shift register on the gate insulating layer 142 above the gate electrode 113a for a shift register and the semiconductor layer 152 of the TFT for switching on the gate insulating layer 142 above the gate electrode 151 of the TFT for switching.

Thereafter, a metal such as molybdenum (Mo), or the like, is stacked through a sputtering method and etched through photolithography to form the source electrode 113c and the drain electrode 113d for a shift register and the source electrode 153 and the drain electrode 154 of a TFT for switching on the semiconductor layers 113b and 152, respectively, to form a GIP circuit line including a shift register in the dummy region and a TFT for switching in each pixel region of the active region A/A.

Subsequently, an organic material such as photoacryl or an inorganic material such as SiOx or SiNx is stacked on the first substrate 101 with the TFT formed thereon to form the passivation layer 114. Here, the passivation layer 144 formed as a dual-layer may be formed by successively stacking an inorganic material and an organic material.

Thereafter, as illustrated in FIG. 7C, a portion of the passivation layer is etched to form the first contact hole 119a, the second contact hole 119b, and the third contact hole 119c in the dummy region D to allow the first ground 111a, the drain electrode 113d for a shift register, and the first common line 114 to be exposed therethrough and to form the fourth contact hole 119d in the active region A/A to allow the drain electrode 154 of the TFT for switching to be exposed.

Subsequently, as illustrated in FIG. 7D, a transparent conductive material such as indium tin oxide (ITO) is stacked on the passivation layer 144 and etched to form at least a pair of common electrode 156 and pixel electrode 158 in the active region A/A. Here, the common electrode 156 and the pixel electrode 158 have a band-like shape having a predetermined width and are arranged to be parallel to each other. The pixel electrode 158 is electrically connected to the drain electrode 154 of the TFT for switching through the fourth contact hole 119d and an image signal is applied from the outside through the TFT for switching.

Subsequently, molybdenum (Mo), aluminum (Al), and molybdenum (Mo) are successively stacked on the passivation layer 144 and etched to form the second ground 111b, the control signal line 112, and the second common line 114b in the dummy region D. The second ground 111b is electrically connected to the first ground 111b through the first contact hole 119a, the control signal line 112 is connected to the GIP circuit (i.e., the drain electrode 113d for a shift register) through the second contact hole 119b, and the second common line 114b is electrically connected to the first common line 114a through the third contact hole 119c.

Here, the second ground 111b, the control signal line 112, and the second common line 114b may be formed with the same metal layer (e.g., Mo/Al/Mo) through the same process, or may be formed with different metals through different processes.

Although not clearly shown, a portion of the second ground 111b formed on the passivation layer 144 may overlap with the GIP circuit or may not. Also, a portion of the second common line 114b may also overlap with the GIP circuit or may not.

Thereafter, although not shown, after the color filter layer and the black matrix are formed on the second substrate, the first substrate and the second substrate may be attached by a sealant and a liquid crystal layer is formed between the first substrate and the second substrate, thus completing an LCD device.

As described above, in an embodiment of the present invention, by overlapping some lines formed in the dummy region with a different line with an insulating layer interposed therebetween, the area of the dummy region can be minimized, and as a result, a bezel area of the LCD device can be minimized to thus reduce a size of the LCD device and obtain a fine outer appearance.

Meanwhile, the LCD device having a particular structure has been described, but it is only for the description purpose and the present invention is not limited thereto.

The present invention may be applied to LCD devices having any structures as long as at least portions of various lines overlap with an insulating layer interposed therebetween in a dummy region to reduce an area of the dummy region.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising: a first substrate including an active region having a plurality of pixel regions to display an image and a dummy region at an outer side of the active region; a plurality of gate lines and data lines formed in the active region to define a plurality of pixel regions;
    a thin film transistor for switching in each pixel region;
    at least one common electrode and pixel electrode in each pixel region; a passivation layer on the first substrate;
    a gate in panel (GIP) gate driver on the dummy region of the first substrate, a gate in panel (GIP) circuit including at least one shift register connected to the gate line, a control signal line, a ground, and a common line in the dummy region,
    wherein the control signal line is connected to a drain electrode of the thin film transistor of the GIP circuit and overlapped with at least a part of the GIP circuit with an insulating layer interposed therebetween and at least a part of the ground and at least a portion of the common line are overlapped in both sides of the GIP circuit with an insulating layer interposed therebetween.

2. The device of claim 1, wherein the control signal line includes a clock signal line, an enable signal line, and a start signal line.

3. The device of claim 1, wherein the control signal line completely overlaps with the GIP circuit.

4. The device of claim 1, wherein the passivation layer is made of photoacryl.

5. The device of claim 1, wherein the passivation layer is made of an inorganic insulating material.

6. The device of claim 1, wherein the passivation layer comprises:
    an inorganic passivation layer; and
    an organic passivation layer on the inorganic passivation layer.

7. The device of claim 1, wherein the TFT for switching comprises:
    a gate electrode on the first substrate;
    a gate insulating layer on the first substrate and covering the gate electrode; a semiconductor layer formed on the gate insulating layer; and a source electrode and a drain electrode on the semiconductor layer.

8. The device of claim 7, wherein the ground comprises: a first ground on the first substrate; and
    a second ground on the passivation layer and electrically connected to the first ground through a first contact hole in the passivation layer.

9. The device of claim 7, wherein the common line comprises: a first common line on the first substrate; and
    a second common line on the passivation layer and electrically connected to the first common line through a second contact hole in the passivation layer.

10. The device of claim 7, wherein the control signal line is on the passivation layer and electrically connected to the GIP circuit through a third contact hole in the passivation layer.

11. The device of claim 1, comprising: a color filter layer on the insulating layer.

12. The device of claim 11, wherein the control signal line, the second ground, and the second common line are on the color filter layer.

13. The device of claim 1, comprising:
    a second substrate attached to the first substrate;
    a black matrix on the second substrate; and
    a liquid crystal layer between the first substrate and the second substrate.

14. A liquid crystal display device comprising: a dummy region on which a gate in panel (GIP) gate driver is mounted; an active region including a plurality of pixel regions and implementing an actual image;
    a gate in panel (GIP) circuit including at least one shift register having a thin film transistor; and
    at least one conductive line on the dummy region,
    wherein the conductive line is connected to a drain electrode of the thin film transistor to the GIP circuit and overlapped with at least a part of the GIP circuit with the insulating layer interposed therebetween, and at least a part of a ground and at least a portion of a common line are disposed and overlapped on both sides of the GIP circuit.

15. The device of claim 14, wherein the control signal line includes a clock signal line, an enable signal line, and a start signal line.

16. The device of claim 14, wherein the insulating layer includes a gate insulating layer and a passivation layer.

17. The device of claim 16, wherein the passivation layer is an inorganic passivation layer, an organic passivation layer, or an organic passivation layer/inorganic passivation layer.

* * * * *